United States Patent [19]
Adams et al.

[11] Patent Number: 5,777,987
[45] Date of Patent: Jul. 7, 1998

[54] METHOD AND APPARATUS FOR USING MULTIPLE FIFOS TO IMPROVE FLOW CONTROL AND ROUTING IN A COMMUNICATIONS RECEIVER

[75] Inventors: John M. Adams; Timothy E. Hoglund; Stephen M. Johnson; Mark A. Reber, all of Colorado Springs; David M. Weber, Monument, all of Colo.

[73] Assignee: Symbios, Inc., Fort Collins, Colo.

[21] Appl. No.: 580,947

[22] Filed: Dec. 29, 1995

[51] Int. Cl.$^6$ ............................................. H04J 3/00
[52] U.S. Cl. .................................................. 370/336
[58] Field of Search .......................... 370/229, 230, 370/231, 235, 236, 410, 428, 429, 426; 395/250

[56] References Cited

U.S. PATENT DOCUMENTS

| | | | |
|---|---|---|---|
| 4,727,537 | 2/1988 | Nichols . | |
| 5,140,582 | 8/1992 | Tsuboi et al. . | |
| 5,233,606 | 8/1993 | Pashan et al. . | |
| 5,309,431 | 5/1994 | Tominaga et al. | 370/235 |
| 5,313,454 | 5/1994 | Bustini et al. | 370/236 |
| 5,361,372 | 11/1994 | Rege et al. | 370/229 |
| 5,426,639 | 6/1995 | Follett et al. . | |
| 5,426,640 | 6/1995 | Hluchyj et al. | 370/235 |
| 5,440,553 | 8/1995 | Widjaja et al. . | |
| 5,493,566 | 2/1996 | Ljungberg et al. | 370/235 |
| 5,528,591 | 6/1996 | Lauer | 370/235 |
| 5,610,745 | 3/1997 | Bennett | 370/236 |

*Primary Examiner*—Ajit Patel
*Attorney, Agent, or Firm*—Daniel N. Fishman; Wayne P. Bailey

[57] ABSTRACT

A method and associated apparatus for using a primary FIFO and one or more secondary FIFOs in parallel to simplify flow control and routing in packet communication operations wherein at least one FIFO (buffer) is associated with each of a plurality of receiving nodes or components within a receiving node. The present invention applies received packets simultaneously to a primary FIFO and to all associated secondary FIFOs in the receiver of a packet communications link. After receipt of a packet, the packet is removed from any secondary FIFOs which correspond to receiver nodes or components to which the packet was not routed. For all receiving nodes or components to which the packet was routed, if the packet was stored in each associated secondary FIFO without overflow, then the packet is also purged from the primary FIFO. If any secondary FIFO overflowed by storage of the received packet, then the packet is purged from the overflowed FIFO and the packet remains stored in the primary FIFO for further processing. Flow control signals are generated and applied to the transmitting source as required in accordance with the status of the primary FIFO. The secondary FIFOs are not directly relevant to flow control logic. The receiving component corresponding to each secondary FIFO locates the next packet for processing by inspecting the associated secondary FIFO as well as the primary FIFO if the secondary FIFO overflowed. These methods and apparatus simplify flow control and routing control in packetized communication receivers.

16 Claims, 6 Drawing Sheets

(FLOW CONTROL PROCESSING)

(FLOW CONTROL PROCESSING WITH BROADCAST)

(FLOW CONTROL PROCESSING WITH BROADCAST)

(PACKET PROCESSING - PRIMARY FIFO)

(PACKET PROCESSING - SECONDARY FIFO)

METHOD AND APPARATUS FOR USING MULTIPLE FIFOS TO IMPROVE FLOW CONTROL AND ROUTING IN A COMMUNICATIONS RECEIVER

BACKGROUND OF THE INVENTION

1. Field of the Invention

The present invention relates to packetized communication systems and in particular to a method and apparatus for using multiple FIFOs for improved flow control and routing of received packets within a receiving node. Even more particularly, the methods and apparatus of the present invention may be advantageously utilized for simplified communication control in a Fibre Channel application.

2. Background of the Invention

In packetized communication systems, information is exchanged between nodes in units referred to as packets. Flow control is the process of informing the transmitting node when the receiving node is ready, or not ready, for another packet transmission. Such flow control methods include designs with dedicated signal paths between the transmitter and receiver to indicate the receiver's readiness (out of band signaling) as well as communication links in which exchanged packets indicate each sides readiness for transmission from the other (in band signaling). In packetized communication designs, flow control information is typically communicated between the communicating nodes at packet boundaries. For example, a receiving node may indicate its readiness status for reception of one or more additional packets. In particular, Fibre Channel communication devices utilizes a concept referred to as "credit" to signify the maximum number of packets (also referred to as frames) a receiving node may safely receive without risk of overflow. The receiver's credit value correlates to the number of buffers available in the receiver for reception of another packet (frame) transmission. A receiver informs the transmitter of its credit value to indicate its readiness for additional packets (if any). The credit value changes as packets are received and acknowledged in the protocol. A packet is transmitted by the transmitter only if the credit value (minus the number of as yet unacknowledged packets) is positive. As received packets are processed, acknowledge frames are sent to the transmission source to indicate changes in the available credit.

In many packetized communication protocols, the receiver must be prepared to receive a packet (frame) having a size up to and including a fixed maximum packet size. For example, in Fibre Channel communications, the receiver and transmitter establish through negotiation processes defined by the protocol) the maximum size of any transmitted frame (packet). The receiver informs the transmitter of the credit available (the number of buffers of the negotiated size) for the communication channel. In general, the transmitter will never transmit more than the credit limit number of frames (packets) without first receiving acknowledgments from the receiver (indicative of available credit).

It is a problem in Fibre Channel communications, as well as other similar packetized communication system, that significant buffer space (available credit) may be wasted by the transmission of packets significantly smaller than the maximum frame size negotiated by the communication channel. A small packet stored in a large buffer wastes a large portion of the frame buffer though it non-the-less reduces the available credit for the communication channel. Designs which segregate large and small received packets are well known, but tend to complicate flow control aspects of the protocol.

In addition, packetized communication systems also often include capabilities to transmit messages to one (or more) of a plurality of receiving elements or components within a receiving node. For example, in a networking communication environment, a single communication link may route information to any of several application programs. Or, for example, a SCSI bus communication link may route information to any of several device IDs or LUNs within a device ID. Routing information is used to identify a particular receiving node or nodes or to identify components within a receiving node which are to process the received message. Routing information identifying the desired destination(s) for a packet is typically embedded within header bytes associated with the packet (typically pre-pended to the start of the packet).

Flow control is complicated by communication designs wherein multiple destinations may be operable within a receiving node. For example, it is common to utilize a buffer (a FIFO circuit device or memory buffer implementing a FIFO) to correspond to each receiving component within a receiving node in a communication link. Each receiving component may therefore process received packets at a pace appropriate to its processing application. Each FIFO associated with a receiving component may therefore be filled and emptied at different rates. This aspect of communication design makes flow control more difficult to implement because a full condition on any one of the plurality of FIFOs may require stopping the transmission source for generating packets for other FIFOs. Flow control designs associated with such communication links therefore tends to be overly complex. Prior solutions have avoided this complexity by simply wasting space in a single FIFO which is adapted to hold a plurality of maximum sized packets. Though small packets occupying but a fraction of the maximum space could be processed rapidly without reserving space in the single FIFO, a single FIFO makes the flow control determinations simpler.

It is evident from the above discussion that a need exists for an improved method and apparatus for performing flow control and routing of received packets in the receiving node of a packetized communication system.

SUMMARY OF THE INVENTION

The present invention solves the above and other problems, thereby advancing the state of the useful arts, by providing a method and associated apparatus for flow control and associated routing in a packetized communication link. The present invention provides for designation of one of a plurality of FIFOs as a primary FIFO. All other FIFOs are designated as secondary FIFOs. Each FIFO is associated with a corresponding reception component (e.g. a particular program or other receiving element). The primary FIFO is the only one of the plurality of FIFOs which participates in flow control determinations. All FIFOs (primary FIFO and all secondary FIFOs) receive transmitted packets in parallel with one another. If the secondary FIFO(s) intended to receive the packet did not overflow by receipt of the packet, then the packet is purged from the primary FIFO and remains in the secondary FIFO for eventual processing by the intended receiving node or component. If the secondary FIFO(s) intended to receive the packet overflowed during receipt of the packet, then the packet is purged from the secondary FIFO(s) and remains stored in the primary FIFO for eventual processing by the intended receiving node or component. The status of the primary FIFO thus suffices to correctly manage the flow control logic and accurately represents the readiness of the receiving node for reception of additional packets.

Routing may be performed in conjunction with the flow control methods and apparatus described above. As noted above, a primary FIFO may be used in conjunction with a plurality of secondary FIFOs wherein each FIFO is associated with a particular receiving node or component. As above, all FIFOs (the primary FIFO and all secondary FIFOs) receive a transmitted packet in parallel. After the entire packet is received, the packet is purged from any secondary FIFOs to which the packet was not routed. If the packet did not cause an overflow condition in any of the secondary FIFOs to which it was routed, then the packet is also purged from the primary FIFO. Otherwise, if at least one of the secondary FIFOs overflowed by virtue of receipt of the packet, then the packet is purged from each such overflowed secondary FIFO and the packet is left in the primary FIFO for eventual processing by the intended receiving node or component. As above, only the primary FIFO participates in flow control decisions and control communicated to the transmitting node.

The methods and associated apparatus are particularly applicable in Fibre Channel communication systems wherein one or more small secondary FIFOs may be used for reception and processing of control related packets while the larger primary FIFO is used for reception and processing of larger data packets. As described above, only the larger data (primary) FIFO is relevant to flow control logic. Flow control logic design is therefore simplified and, additionally, the secondary FIFO may be downsized to only that required for retention of smaller control packets which tend to be processed more rapidly. The reduction in size of the secondary FIFO therefore provides additional reduction in complexity and resultant costs as compared to prior designs.

Depending upon the communication protocols used by the packetized communication application, two or more FIFOs may be utilized to subdivide the processing of packets between multiple reception components associated with the FIFOs. For example in a Fibre Channel communication application, the primary FIFO may be associated with a reception component which processes data frames (packets). The primary FIFO must therefore be large enough to store a number of maximum sized frames. The number of frames and the maximum size of each frame is determined by negotiation at the establishment of the communication link. A secondary FIFO in such an exemplary application may be associated with processing of control or status related packets specific to the protocol using the Fibre Channel communication link. Only packets which pertain to control and status will be routed to this secondary FIFO. Since this secondary FIFO is not intended to contain data packets, the number and maximum size of frame buffers therein may be different than that of the primary FIFO. Specifically, this secondary FIFO may contain frame buffers only large enough to store the largest control or status frame. Another secondary FIFO in this exemplary application may be associated with the processing of acknowledgment packets defined by the Fibre Channel link layer standards. Only packets received which acknowledge transmission of other packets are routed to this additional secondary FIFO.

It is therefore an object of the present invention to provide methods and associated apparatus for performing flow control in a packetized communication receiver node.

It is a further object of the present invention to provide methods and associated apparatus for performing flow control and routing in a packetized communication receiver node.

It is still a further object of the present invention to provide methods and associated apparatus for using two or more buffers to perform flow control and routing within a packetized communication receiver node.

It is yet another object of the present invention to provide methods and apparatus for using a primary buffer and one or more secondary buffers for performing flow control and routing within a packetized communication receiver node.

It is yet another object of the present invention to provide methods and apparatus for using a primary buffer and one or more secondary buffers for performing flow control and routing within a packetized communication receiver node wherein only the primary buffer participates in flow control logic.

It is still another object of the present invention to provide methods and apparatus for using a primary buffer and one or more secondary buffers, each being smaller than the primary buffer, for performing flow control and routing within a packetized communication receiver node wherein only the primary buffer participates in flow control logic.

The above and other objects, aspects, features, and advantages of the present invention will become apparent from the following description and the attached drawing.

DETAILED DESCRIPTION OF THE INVENTION

Figure 1:
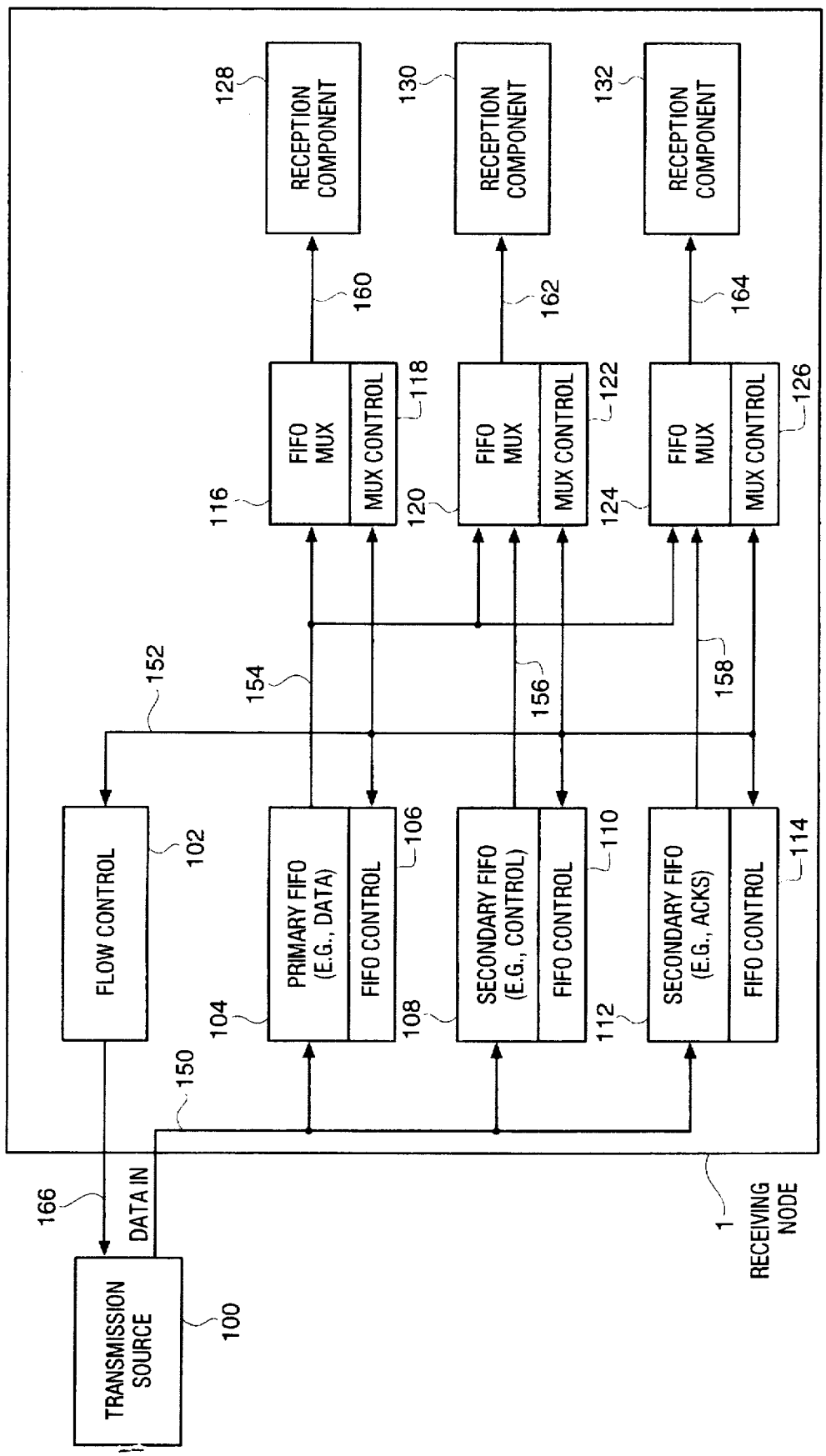
FIG. 1 is a block diagram of the present invention in which a primary FIFO and two secondary FIFOs are utilized while only the primary participates in flow control aspects of the receiver operation.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of the apparatus of the present invention in which the flow control and routing control methods of the present invention may be applied. A transmission source 100 generates and applies packets of information to the transmission medium 150 for transmission to the receiving node 1. These packets include command and control information as well as data for processing by the receiving node 1. Flow control logic 102 within receiving node 1 generates and applies flow control related information to the transmission medium 166 for return to the transmission source 100. The flow control information generated by flow control logic 102 informs the transmission source 100 of the status of the receiving node 1 with regard to readiness for reception of another packet.

All packets received over transmission medium 150 are applied to each of a plurality of memory buffers (FIFOs) for storage awaiting further processing. Specifically, as shown in FIG. 1, primary FIFO 104, secondary FIFO 108, and secondary FIFO 112 each receive every packet transmitted by transmission source 100. FIFO control logic circuits 106, 110, and 114, are associated with FIFOs 104, 108, and 112, respectively, and exchange status and control information over bus 152 with flow control logic 102 to inform transmission source 100 of the receiving node's 1 readiness for another packet.

One of ordinary skill in the art will readily recognize that the term FIFO as used herein refers to any memory device and associated control logic that stores information in a manner and structure such that the next element read from the FIFO is the oldest element written to the FIFO. A FIFO includes an indicator which defines the position of the next element to be written to the FIFO (referred to herein as a pointer or position pointer). The pointer may be a simple electronic counter device or a pointer variable where a FIFO is implemented as a programming construct in a general purpose data processing device. FIFOs, implemented either as electronic circuits or as programmed structures and instructions within a general purpose data processing device, are well known to those of ordinary skill in the art.

Each FIFO 104, 108, and 112 is associated with a corresponding reception component 128, 130, and 132, respectively. Each reception component 128, 130, and 132 is representative of an element which processes particular types of received information. The reception components may be implemented as programmed instructions in a data processing device or may represent electronic components designed to process particular types of received packets. For example, a programmed computer may perform processing required of received data packets while custom designed application specific electronic circuits may perform all processing for lower level protocol specific packets for which a response may be rapidly and automatically generated.

In particular FIG. 1 presents an exemplary configuration of a receiver node 1 as applied to Fibre Channel communications control. The primary FIFO 104 and the corresponding reception component 128 may be responsible for processing of data packets received from the transmission source 100. Processing of data packets frequently requires the general purpose processing power of a programmable data processor. Therefore, reception component 128 may be implemented in Fibre Channel applications as a programmed general purpose computer. Secondary FIFO 108 and the corresponding reception component 130 are dedicated to the processing of control and status related packets received from the transmission source 100. Secondary FIFO 112 and the corresponding reception component 132 are responsible for the processing of acknowledge packets (ACKs). Reception components 128, 130, and 132 may be implemented either as custom electronic circuits within the receiving node 1 or as a programmed data processing element. One of ordinary skill in the art will readily recognize that other configurations may be equally applicable to Fibre Channel communications. For example, a single secondary FIFO (and associated reception component) may be used for processing of all non-data packets rather than the two secondary FIFOs depicted in FIG. 1. FIG. 1 is intended only as an exemplary configuration of a receiving node 1 in which the methods of the present invention may be advantageously applied.

Fibre Channel data packets received from transmission source 100 are therefore routed to primary FIFO 104 for eventual processing by reception component 128. Similarly, control and status packets received from transmission source 100 are routed to secondary FIFO 108 for storage until eventual processing by reception component 130. Likewise, acknowledgment (ACK) packets are routed to secondary FIFO 112 for temporary storage awaiting eventual processing by reception component 132. As discussed in detail below, the methods of the present invention remove copies of a received packet from any FIFO to which it is not routed. If the FIFO to which a packet is routed overflows by virtue of reception and storage of the packet in the FIFO, then the copy of the packet stored in the primary FIFO is retained and the overflow FIFO is restored to a state indicative of the missing packet. Only the status of the primary FIFO 104 is relevant to flow control logic 102 determinations for generation and application of flow control information to the transmission source 100. Since the flow control signals are assured to accurately represent the status of the primary FIFO, it is always possible to retain, in the primary FIFO, a packet which overflowed a secondary FIFO.

As each reception component 128, 130, or 132 is ready to process another packet, it awaits availability of a packet in its corresponding FIFO, 104, 108, 112, respectively. If no packet is available in the corresponding FIFO then the reception component 130 and 132 determine whether any overflow packet is available in the primary FIFO 104. FIFO control logic 106, 110, and 114 as well as mux control logic 118, 122, and 126 control the elements of the receiving node 1 to transfer the available packet from the FIFO in which it is stored to the appropriate reception component 128, 130, or 132.

Specifically, if a packet routed to reception component 128 is available in primary FIFO 104, the FIFO control logic 106 and mux control logic 118 are operable to direct the data packet over bus 154, through FIFO mux 116, onto bus 160 to the reception component 128 for further processing. If a control or status packet is available in secondary FIFO 108, then FIFO control logic 110 and mux control logic 122 are operable to apply the control or status packet from secondary FIFO 108 over bus 156 through FIFO mux 120 and onto bus 162 to reception component 130 for further processing. If on the other hand, no control or status packet is available in secondary FIFO 108, then primary FIFO 104 is inspected by FIFO control logic 110 and 106 to determine if an overflow packet routed for processing as a control or status packet has overflowed the secondary FIFO 108 and remains stored in the primary FIFO 104. If so, FIFO control 106 and 110 and mux control 122 are operable to apply the overflow control or status packet in primary FIFO 104 onto bus 154, through FIFO mux 120, and onto bus 162 for processing by reception component 130. In like manner, FIFO control logic 114 and mux control logic 126 are operable to direct an ACK packet available in secondary FIFO 112 onto bus 158, through FIFO mux 124, onto bus 164 to reception component 132 for further processing. If on the other hand, no ACK packet is available in secondary FIFO 112, then primary FIFO 104 is inspected by FIFO control logic 114 and 106 to determine if an overflow packet routed for processing as an ACK packet has overflowed the secondary FIFO 112 and remains stored in the primary FIFO 104. If so, FIFO control 106 and 114 and mux control 126 are operable to apply the overflow ACK packet in primary FIFO 104 onto bus 154, through FIFO mux 124, and onto bus 164 for processing by reception component 132.

If the communication application requires that packets be processed by the appropriate reception component in the order they were received, methods of the present invention discussed in detail below can assure proper sequencing of the packets delivered to the reception component by generating a unique tag ID or sequence number for each packet. The tag ID may then be used when interrogating the FIFOs for available packets to determine the original order in which the packets were received. The methods of the present invention may then retrieve the packets from the various FIFOs in the same order in which they were received.

As discussed in detail below, the methods of the present invention may be applied in communication protocols wherein a packet is "broadcast" to a plurality of reception components within receiving node 1. Such a packet is routed to more than one of the plurality of FIFOs which adds some complexity to the flow control methods of the present invention. Although the apparatus of FIG. 1 has been described primarily as applied to Fibre Channel communication, it is similarly applicable to many packetized communication systems wherein packets are processed according to attributes possessed by the packet and wherein flow control logic is required to generate and apply flow control information to a transmission source.

Figure 2:
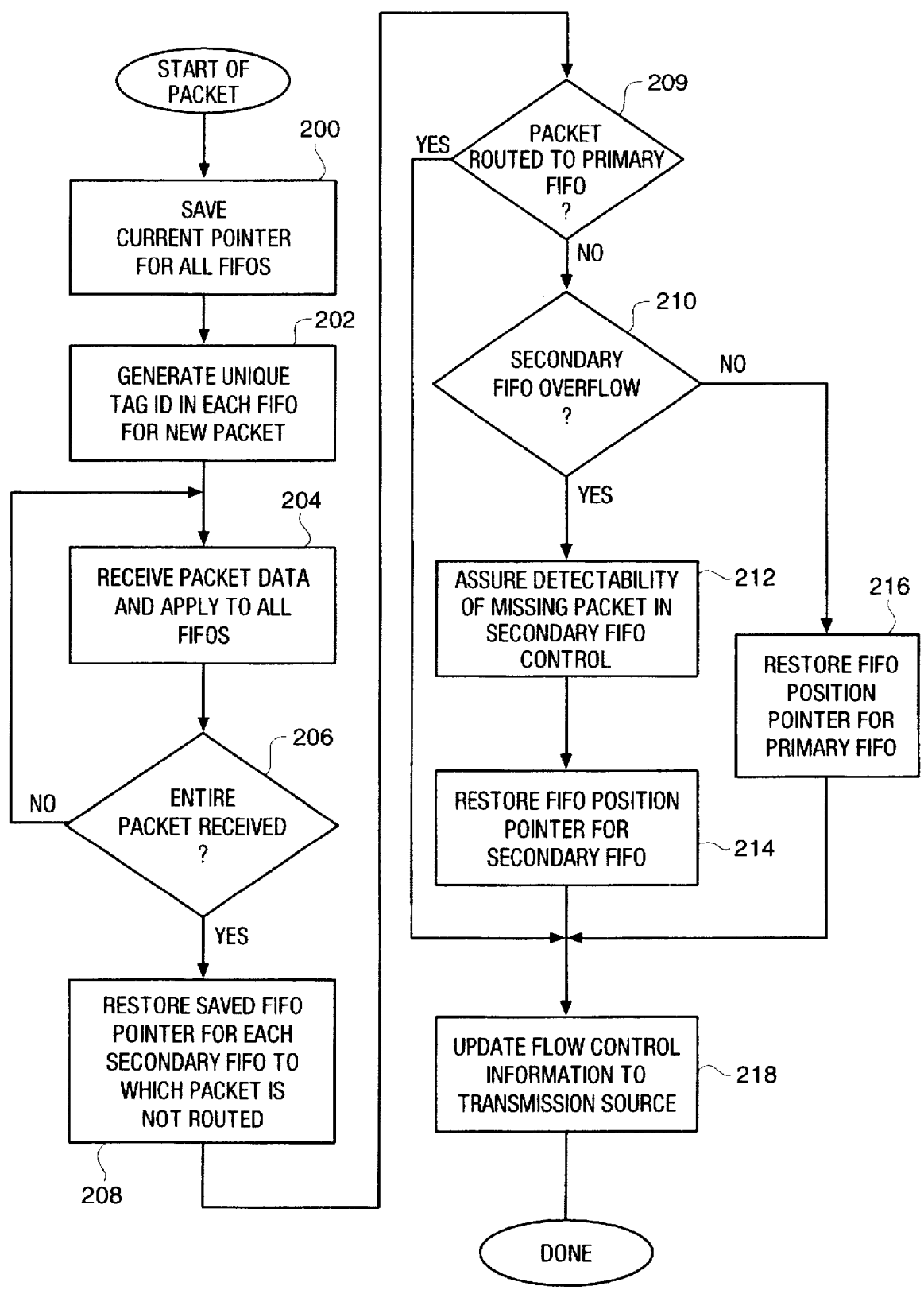
FIG. 2 is a flowchart describing the flow control methods of the present invention wherein each packet is routed to a single reception component.
Figure 3:
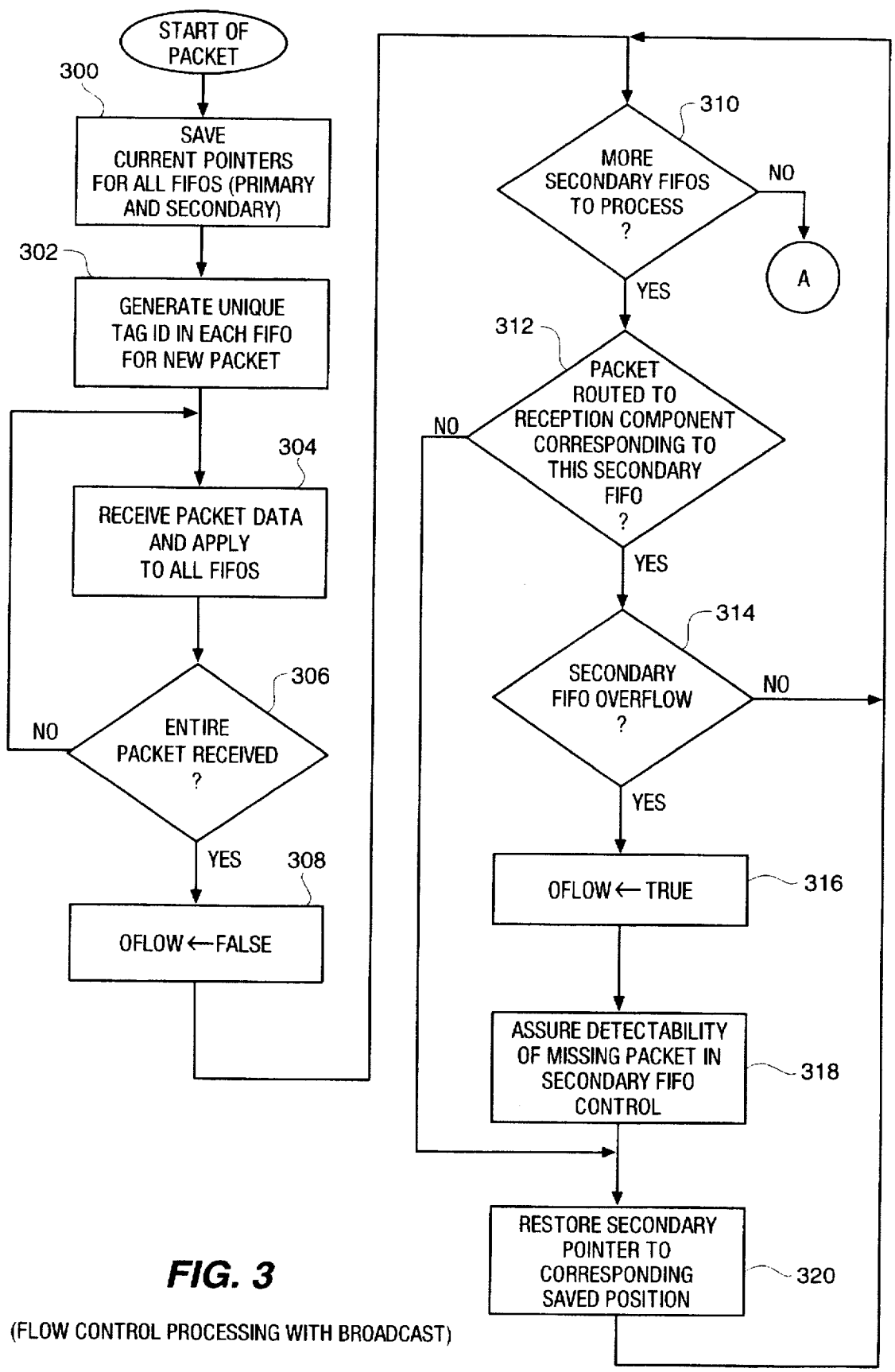
FIG. 3 is a flowchart describing the flow control methods of the present invention wherein each packet is routed to one or more reception components.
Figure 4:
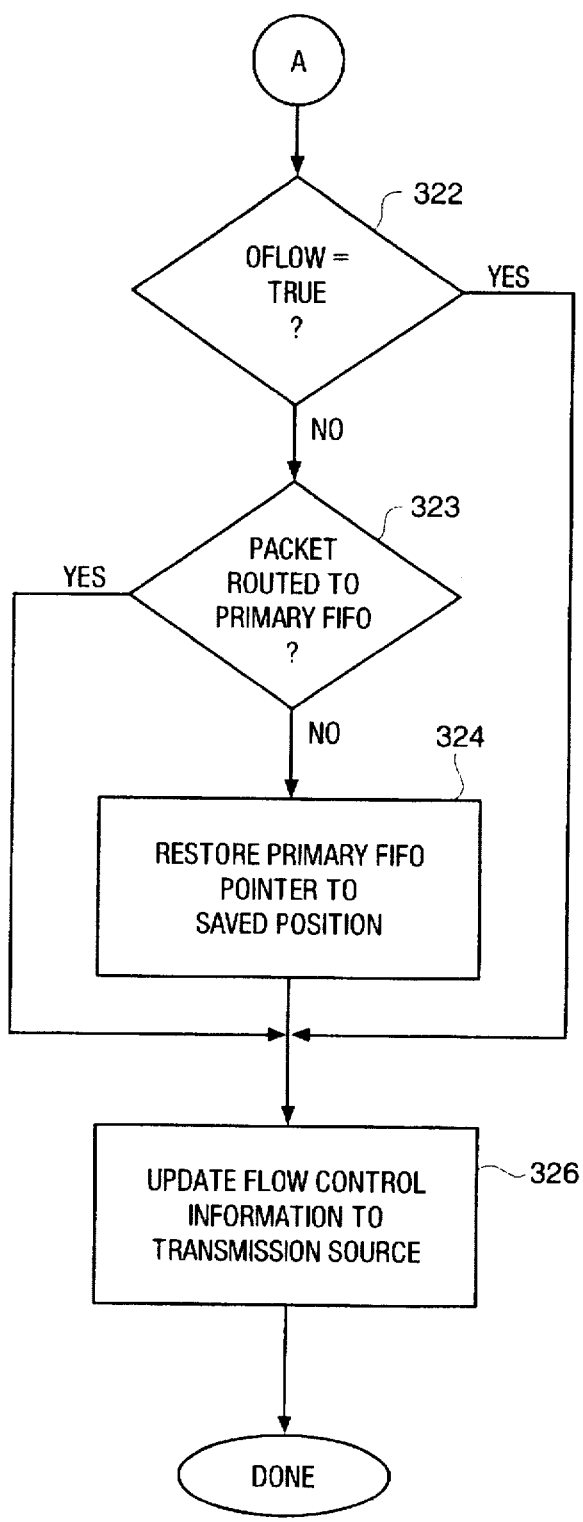
FIG. 4 is a flowchart which continues from the flowchart of FIG. 3.

FLOW AND ROUTING CONTROL METHOD WITHOUT BROADCAST:

FIGS. 2–4 are flowcharts describing the methods of the present invention for controlling the flow of information from the transmission source 100 of FIG. 1 to the receiving node 1. FIG. 2 describes an embodiment of the flow control methods in which each packet is routed to a single reception component within the receiving node. In other words, FIG. 2 describes the flow control methods of the present invention where routing of the packets as specified by an associated communication standard precludes broadcast of a packet to a plurality of reception components in a receiving node.

Element 200 of FIG. 2 is first operable in response to the start of reception of a packet to save the current position pointers for each FIFO of the receiving node. This saved position pointer is used to purge the packet from the FIFO as required by simply restoring the current position pointer of the FIFO to this saved value. The current position pointer is saved by copying the current pointer value to a memory location for later retrieval. This memory location may be within the FIFO itself or elsewhere in the receiving node as is known to those of ordinary skill in the art.

Element 202 is next operable (e.g. within control logic associated with each FIFO) to generate an unique tag ID for the packet about to be received. As noted above, a sequence number or unique tag ID may be used by the methods of the present invention to assure that packets (in particular overflow packets as discussed below) are processing the same order in which they were received. The tag ID generated by operation of element 202 is used to verify the proper sequencing of packets delivered to the several reception components. The tag ID generated is stored along with each received packet in each FIFO if such sequencing of the processed packets is required.

Elements 204 and 206 are then operable to receive all the transmitted packet information from the transmission source and apply the received information to all FIFOs (e.g. primary FIFO 104 as well as secondary FIFOs 108 and 112 of FIG. 1). When element 206 determines that the entire packet has been received, processing continues with element 208. Otherwise, processing continues by looping back to element 204 to receive additional packet information and apply it to each FIFO. The method for determining whether an entire packet has been received is unique to the particular communication application and determined in accordance with the specification of the particular communication protocol.

Once the entire packet has been received and applied to all FIFOs, element 208 is next operable to remove the packet from any secondary FIFOs which correspond reception components to which the packet was not routed. The packet need only be stored at this point in the secondary FIFO corresponding to the desired reception component (if any) and the primary FIFO. If the packet is routed only to the reception component corresponding to the primary FIFO, then element 208 is operable to remove the received packet from all secondary FIFOs. The packet is removed from a FIFO as noted above by simply restoring the saved position pointer to the FIFO control. This essentially restores that FIFO to its state prior to reception of the new packet. If the packet was properly routed to the primary FIFO as determined by operation of element 209, then processing continues with element 218 since the packet has been removed from all secondary FIFOs. As noted below with respect to FIG. 3 the method is slightly more complex if broadcast routing is enabled wherein a received packet may be properly routed to multiple reception components.

If the packet was properly routed to a secondary FIFO, then element 210 determines whether the secondary FIFO to which the packet was routed overflowed by reception of the new packet. If the packet was not routed to any secondary FIFO, then processing of the method is completed and the packet simply remains in the primary FIFO for eventual processing by the corresponding reception component. If the newly received packet was routed to a reception component corresponding to a secondary FIFO and the secondary FIFO overflowed, then processing continues with element 212 and 214. Otherwise, processing continues with element 216 then 218. Element 216 is operable to remove the packet from the primary FIFO by restoring the saved position pointer to the primary FIFO. Since the packet was successfully stored in the secondary FIFO corresponding to the intended reception component, the extra copy in the primary FIFO is no longer required. Processing then continue with element 218. If the secondary FIFO overflowed by application of the newly received packet, then element 212 is operable to assure later detection of the missing packet in the secondary FIFO. The unique tag ID generated by element 202 may be used, for example, to record a status in the overflowed secondary FIFO that the identified packet was not successfully stored in the secondary FIFO. Element 214 is then operable to remove the newly received packet from the overflowed secondary FIFO. The copy of the packet applied to the primary FIFO is retained in the primary FIFO for eventual processing by the reception component corresponding to the overflowed secondary FIFO. Processing then continues with element 218.

Element 218 is finally operable to update the flow control information applied to the transmission source to reflect changes (if any) to the readiness of the receiving node to receive new packets. The flow control information reflects the space available in the primary FIFO for storage of a new packet. Since the primary FIFO is adequately sized to store integral multiples of maximum sized frames (packets), the transmission source can be assured that the receiving node is ready or not ready for reception of a new packet by the status of the primary FIFO. Overflow packets destined for a full secondary FIFO are temporarily stored in the primary FIFO so that overflow of a secondary FIFO will not cause loss of information exchanged between the transmission source and the receiving node. Additionally, because the flow control information accurately reflects the readiness of the primary FIFO to receive additional packets, each of up to the maximum allowed size, the transmission source will never overrun the primary FIFO capacity. Processing of this method is then complete until another packet arrives. Packets stored in the various FIFOs are processed by the reception components, each at its own pace.

This method of the present invention assures that no packets will be lost in the exchange between the transmission source and the receiving node while permitting a simple flow control technique. More importantly, the secondary FIFOs may be sized significantly smaller than the primary FIFO yet store a large number of smaller packets routed to a particular recaption component. In particular, as applied to Fibre Channel communications, the control or status packets are routed to a specialized processor (reception component 130) through a dedicated secondary FIFO 108 and the ACK packets are routed to their dedicated processor (reception component 132) through a dedicated secondary FIFO 112. Data packets along with overflow packets from the secondary FIFOs are stored in the primary FIFO 104. This structure and the associated flow control method discussed above permits rapid response to control packets without wasting the space in the primary FIFO. Rather than storing short packets (such as ACK and RRDY) in the same FIFO as the potentially lengthy data packets, the shorter control packets are isolated in their own respective FIFOs (secondary FIFOS 108 and 112). This improves the utilization of the primary FIFO 104 for the throughput of data and potentially improves the responsiveness of the receiving node 1 to the reception of control packets (e.g. ACKs).

FLOW CONTROL METHOD ENHANCED WITH BROADCAST:

The method depicted in FIG. 2 and described above may be easily extended to permit broadcast of packets (i.e. the transmission and routing of a packet to multiple reception components within a receiving node). Such broadcast transmission are common, for example, in SCSI communications or network communication protocols. The flowcharts of FIGS. 3 and 4 together describe the methods of the present invention to perform flow control in a packetized communication system wherein broadcast message are permitted.

Elements 300–306 of FIG. 3 operate similarly to elements 200–206 of FIG. 2 described above. Specifically, in response to the start of a new packet, elements 300 saves the position pointer for each FIFO in the receiving node. Element 302 generates a unique tag ID for the packet to be stored with the packet in each FIFO. Elements 304–306 receive all information for the new packet and apply the received packet to all FIFOs in parallel. Elements 308–324 then determine if any of the secondary FIFOs to which the packet is routed have overflowed. If none of the secondary FIFOs to which the packet is routed have overflowed, then the copy of the packet in the primary FIFO is deleted. Otherwise, if any of the secondary FIFOs to which the packet was routed overflowed, the copy of the packet in the primary FIFO is retained until all reception components which require processing of the packet have retrieved and processed the packet from the corresponding secondary FIFO or from the copy of the packet retained in the primary FIFO.

In particular, element 308 sets a local flag variable, OFLOW, indicative of overflow in any of the secondary FIFOs to FALSE. Elements 310–320 are then operable iteratively to check each of the plurality of secondary FIFOs in the receiving node for routing of the packet and for overflow of the FIFO. Element 310 is operable to determine whether additional secondary FIFOs remain to be checked by elements 312–320. If all secondary FIFOs have been checked by operation of elements 312–320, processing continues with element 322 on FIG. 4 (at the continuation label "A"). Otherwise, processing continues with element 312 to determine whether the newly received packet is routed to the reception component corresponding to the secondary FIFO being checked. If the packet is not routed to this secondary FIFO, the processing continues at element 320 to remove the packet from the secondary FIFO currently being checked. Otherwise processing continues with element 314 to determine whether the secondary FIFO currently being checked overflowed by reception of the newly received packet. If the secondary FIFO currently being checked did not overflow, processing continues by looping back to element 310 to process additional secondary FIFOs. The newly received packet, successfully stored in the current secondary FIFO to which it was routed is left in the secondary FIFO for eventual processing by the reception component corresponding to the secondary FIFO.

If element 314 determines that the secondary FIFO currently being checked overflowed by application of the newly received packet, then processing continues with element 316 to set the OFLOW flag variable to TRUE indicative of any overflow in any of the secondary FIFOs to which the packet was routed.

Element 318 is next operable to assure later detection of the fact that the secondary FIFO currently being checked has missed the newly received packet due to overflow. Any of several techniques will be recognized by one of ordinary skill in the art to note this fact to assure later detection of the missing packet during processing of the packets stored in the various FIFOs. For example, since each packet may be associated with a unique tag ID stored with the packet as discussed above, the tag IDs may themselves be used to denote a missing packet. The tag IDs may, for example, include a sequentially incrementing numeric field. Gaps in the numeric sequence of the tag IDs stored in a FIFO may be indicative of a missing packet due to overflow. Alternatively, the unique tag ID generated by element 302 may be used, for example, to record a status in the overflowed secondary FIFO that the identified packet was not successfully stored in the secondary FIFO. Since the FIFO may itself be filled to capacity, the associated FIFO control logic may include a statically sized auxiliary storage for recordation of information indicating the overflowed packet(s). For example, a bit in a bit mapped field associated with each secondary FIFO may be set to indicate that a corresponding packet with a tag ID associated with the bit position is missing from the secondary FIFO due to overflow. Each packet tag ID may be associated with a bit in the bit mapped field by, for example, using modulo arithmetic on the tag ID to compute a bit position in the bit mapped field. Element 318 is representative of all such techniques and equivalent methods known to those of ordinary skill in the art to assure that the fact of an overflow of the secondary FIFO currently being checked may be detected later when packets are retrieved from the secondary FIFO for processing.

Processing then continues with element 320 which is operable, as noted above, to remove the newly received packet from the secondary FIFO currently being checked. As above, the packet is removed by restoring the saved position pointer for the secondary FIFO to its value prior to the start of the reception of the new packet. Processing then continue by looping back to element 310 to check other secondary FIFOs for overflow conditions.

When element 310 determines that all secondary FIFOs have been checked by operation of elements 312–320, processing continues at element 322 of FIG. 4 (at the label "A"). Element 322 is operable to determine whether the OFLOW flag variable was set TRUE during the iterative operation of elements 310–320. If the OFLOW flag variable was not set TRUE, indicative that no secondary FIFO overflowed by application of the newly received packet, processing continues with element 324 to remove the packet from the primary FIFO. The copy of the packet in the primary FIFO is no longer needed for processing by the reception components corresponding to the secondary FIFOs. Finally, element 326 is operable, as above for element 218, to update the flow control information applied to the transmission source to reflect the updated status of the primary FIFO. The space available in the primary FIFO, as discussed above, reflects the readiness of the receiving node for the transmission of another packet.

Figure 5:
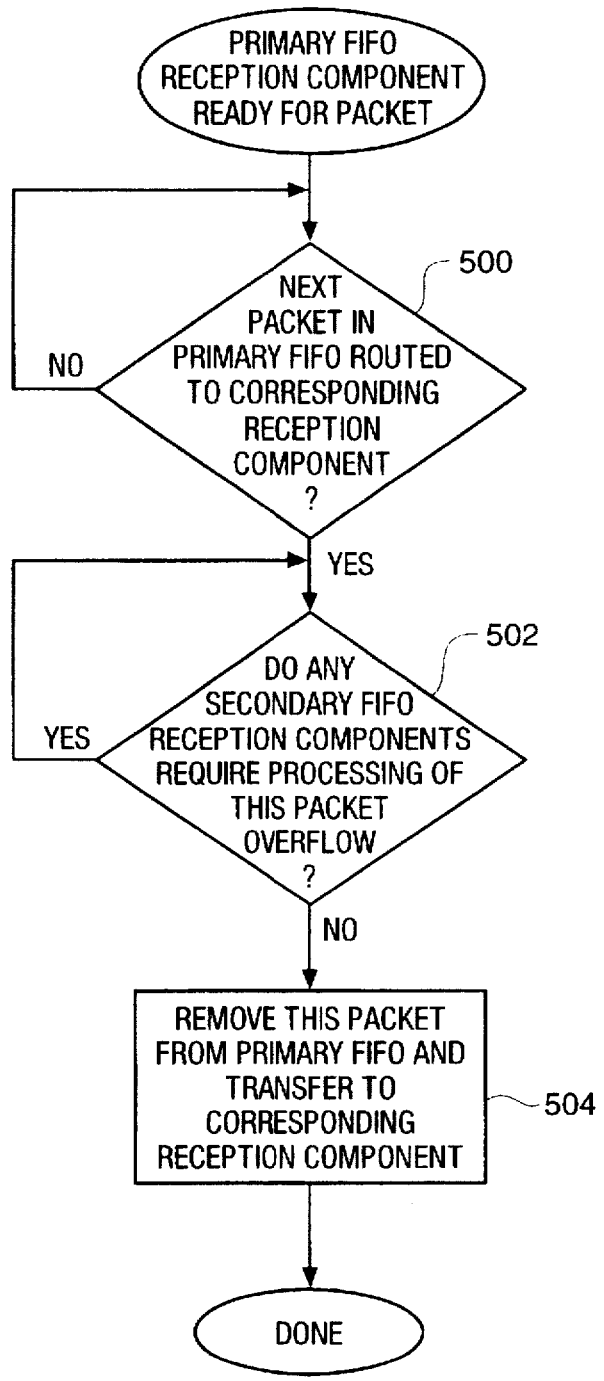
FIG. 5 is a flowchart describing the methods of the present invention for processing of a received packet within the primary FIFO.
Figure 6:
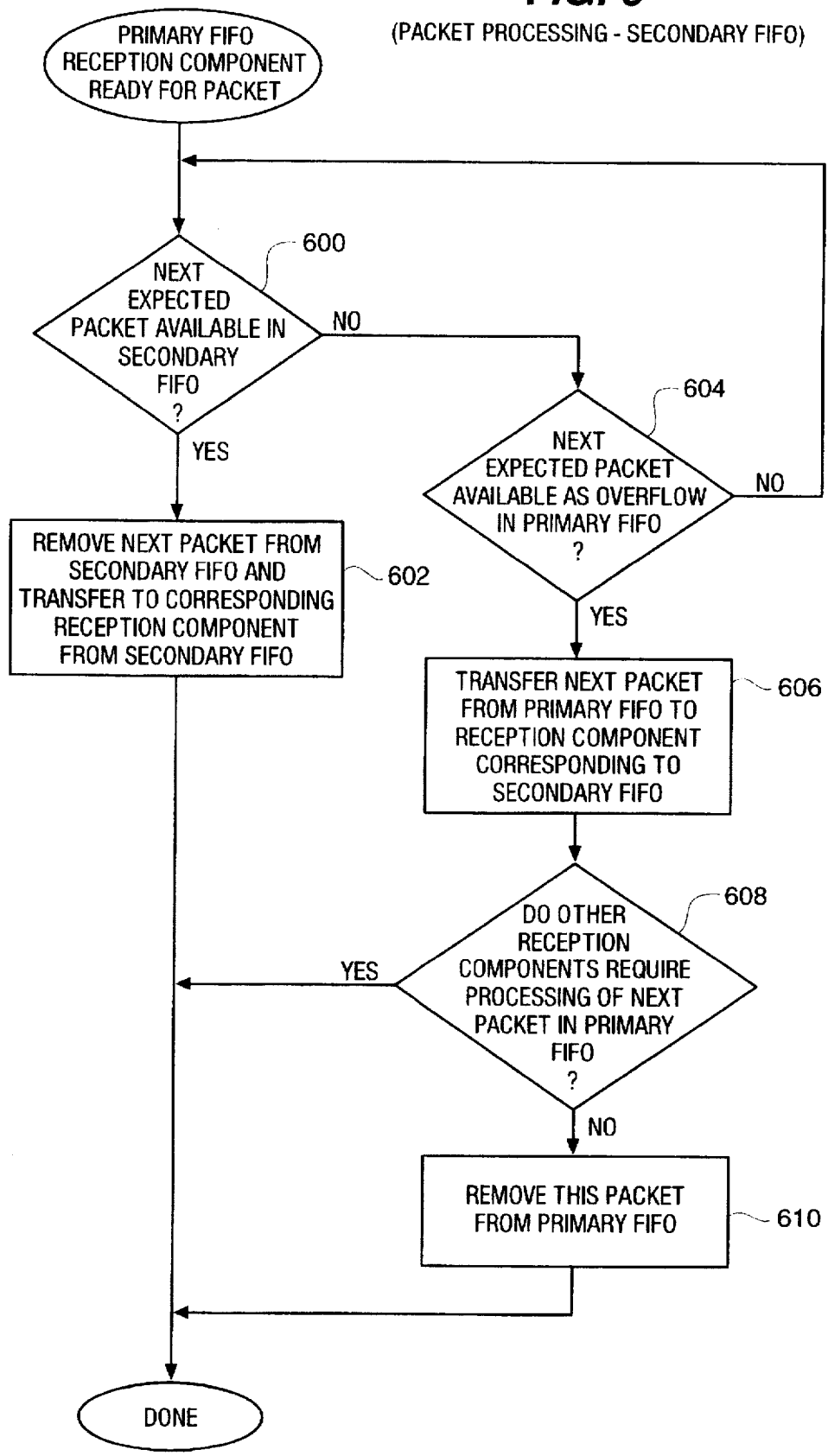
FIG. 6 is a flowchart describing the methods of the present invention for processing of a received packet within one of the plurality of secondary FIFOs depicted in FIG. 1.

PACKET PROCESSING METHODS:

FIGS. 5 and 6 are flowcharts describing the methods of the present invention operable to retrieve packets from FIFOs for further processing by reception components. Due to the use of a plurality of FIFOs in the flow control methods discussed above, the methods of the present invention also provide for retrieval of received packets from FIFOs as appropriate given the overflow storage methods discussed above.

The flowchart of FIG. 5 describes a method of the present invention operable to retrieve packets routed to the primary FIFO to permit processing of the packet by the corresponding reception component. Element 500 is first operable to await a packet available in the primary FIFO which was routed to the corresponding reception component. As described above, packets stored in the primary FIFO may be either routed to the corresponding reception component, or may be temporarily retained in the primary FIFO to avoid loss of the packet due to overflow of the secondary FIFO to which the packet was routed. Element 500 therefore waits until the next available packet in the primary FIFO is one which was routed to the reception component corresponding to the primary FIFO.

When the next available packet is one routed to the primary FIFO, element 502 is next operable to await the completion of any use of the packet by reception components corresponding to overflowed secondary FIFOs to which the packet was also routed. As discussed above with respect to FIGS. 3 and 4, a single packet could be routed both to the primary FIFO and to one or more secondary FIFOs. If any of those secondary FIFOs overflowed by application of the packet, the corresponding reception component will retrieve the packet from the primary FIFO. Element 502 is therefore operable to await completion of use of the packet by these reception components corresponding to secondary FIFOs, to which the packet was also routed, which overflowed.

Element 504 is then operable to remove the packet from the primary FIFO and transfer the packet information through to the reception component corresponding to the primary FIFO. Processing of this packet is then completed and the space previously occupied by the packet is again available for reception of a new packet (as discussed above).

The flow chart of FIG. 6 describes the method of the present invention operable to process packets within the reception component corresponding to secondary FIFOs to which a packet is routed. The method depicted in FIG. 6 is operable simultaneously by and on behalf of each of the secondary FIFOs and simultaneously with the method of FIG. 5 operable within and on behalf of the primary FIFO. One of ordinary skill in the art will readily recognize that mutual exclusion of access to shared structures and variables (e.g. FIFOs and associated control logic) may be required for cooperation of the several parallel operable methods.

Element 600 is first operable to determine whether the next expected packet is available from the secondary FIFO corresponding to a given reception component for which the method is operating. If the next expected packet is available in the secondary FIFO, the processing continues with element 602 to remove the packet from the secondary FIFO (as described above) and to transfer the packet to the corresponding reception component for processing. The space previously occupied by the packet is then made available for reception of other packets routed to this reception component. Processing is then completed for this packet.

If the next expected packet is not available in the secondary FIFO corresponding to the reception component, then processing continues with element 604 to determine whether the packet is available in the primary FIFO as an overflow packet temporarily retained in the primary FIFO. If the packet is also not available in the primary FIFO as an overflow packet, then processing continues by looping back to element 600 to await the availability of the next expected packet at either corresponding the secondary FIFO or as an overflow packet in the primary FIFO.

If the next expected packet eventually is available as an overflow packet in the primary FIFO, then processing continues with element 606 to copy the packet from the primary FIFO to the reception component corresponding to the secondary FIFO being processed by this method. The packet cannot be removed from the primary FIFO until all other processing by all other reception components is completed. As noted above, in a broadcast communication application, a packet may be routed to a plurality of reception components for processing. One or more secondary FIFOs could overflow for such a broadcast packet. In addition, the packet may have been routed to the primary FIFO as part of the broadcast. Therefore the packet must not be removed from the primary FIFO unless the processing of the packet by this reception component is the last processing required of the packet. Element 608 is operable to determine whether this processing of the overflow packet in the primary FIFO is the last possible processing of the packet required of the receiving node. If element 608 so determines that the processing of the packet is completed, then processing continue with element 610 to remove the packet from the primary FIFO (as discussed above). In either case, processing is then completed for this reception component on this packet.

One of ordinary skill in the art will readily recognize that the methods described by the flowcharts of FIGS. 2–6, and in particular the methods described by FIGS. 5 and 6 may be simplified if the order in which received packets are processed is not relevant to the communication application. For example, the loop described above with respect to elements 600 and 604 of FIG. 6 may be modified such that any packet which is available in the corresponding secondary FIFO or available as an overflow packet in the primary FIFO may be processed next regardless of its sequence in the reception of the packets. In other words, the tests described by elements 600 and 604 may simply test for the availability of ANY packet, rather than the next expected packet.

One of ordinary skill in the art will readily recognize that information regarding the number of reception components which require processing of the overflow packet may be stored in control logic associated with the receiving node (e.g. in the FIFO control logic for example in association with each packet stored therein. For example, a simple bitmap field may suffice for each packet to indicate the number of reception components to which the packet was routed as well as to identify which components the packet was routed to. Each bit in the bit field can represent, if set, that the packet associated with the bit field was routed to the reception component associated with the bit. Conversely, if a bit in the bit field is clear, then the corresponding packet was not routed to the associated reception component.

Similarly, information identifying the sequence of packets in a FIFO and the identity and number of any missing packets may be encoded as a field associated with FIFO control logic of each FIFO. One of ordinary skill will readily recognize many variants of the structures and methods described above and depicted in the associated figures which achieve the same purpose. All such variants are contemplated as within the protection afforded the present invention as defined by the attached claims.

FIBRE CHANNEL APPLICATION—BEST MODE:

As applied to a Fibre Channel communication system, the best presently known mode is to provide two FIFOs. A primary FIFO for storage and processing of data packets received at the receiving node, and a secondary FIFO for storage and processing of all other packets received at the receiving node. A reception component adapted to processing of data packets is associated with the primary FIFO and retrieve the data packets to be processed from the primary FIFO. A reception component adapted to rapidly process all other packets (e.g. control, status, acknowledgments, etc.) is associated with the secondary FIFO and retrieves packets to be processed from the secondary FIFO or from the primary FIFO if a packet is detected as missing in the secondary FIFO due to an overflow. The tag ID field associated with each packet received is used by control logic associated with the FIFOs to determine that a packet is missing due to a gap in the sequence numbers of the tag ID.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A flow control method, operable in a receiving node of a packetized communication system, comprising the steps of:

applying a received packet from a transmitting node to a primary FIFO in said receiving node and to a secondary FIFO in said receiving node;

determining whether said received packet is successfully applied to said secondary FIFO;

purging said received packet from said secondary FIFO responsive to a determination that said received packet was not successfully applied to said secondary FIFO;

purging said received packet from said primary FIFO responsive to a determination that said received packet was successfully applied to said secondary FIFO;

determining the readiness of said receiving node to receive another packet in accordance with status of said primary FIFO; and applying a flow control signal to said transmitting node indicative of the readiness of said receiving node to receive another packet.

2. The method of claim 1 wherein the step of determining successful application of said received packet to said secondary FIFO includes the step of:

detecting an overflow condition of said secondary FIFO by the application of said received packet.

3. The method of claim 1 wherein the step of determining readiness includes the steps of:

determining that said receiving node is ready to receive a packet when sufficient space is available in said primary FIFO to store a received packet; and determining that said receiving node is not ready to receive a packet when sufficient space is not available in said primary FIFO to store a received packet.

4. A flow and routing control method, operable in a receiving node of a packetized communication system having a plurality of receiving components each associated with one of a plurality of FIFOs including a primary FIFO and a plurality of secondary FIFOs, said method comprising the steps of:

applying a received packet from a transmitting node simultaneously to said primary FIFO and to at least one of said plurality of secondary FIFOs to which said received packet is routed;

determining a status of said Primary FIFO;

determining the readiness of said receiving node to receive another packet in accordance with said status of said primary FIFO; and applying a flow control signal to said transmitting node indicative of the readiness of said receiving node to receive another packet.

5. The method of claim 4 further comprising the step of:

purging said received packet from said primary FIFO in response to a determination that said received packet is not routed to said primary FIFO and that none of said at least one of said plurality of secondary FIFOs overflowed.

6. The method of claim 4 wherein the application of a received packet includes the steps of:

applying said received packet to said primary FIFO;

applying said received packet to said plurality of secondary FIFOs; and purging said received packet from any of said plurality of secondary FIFOs to which said received packet is not routed.

7. The method of claim 4 wherein the step of determining readiness includes the step of:

determining that said receiving node is ready to receive a packet if sufficient space is available in said primary FIFO to store a received packet; and determining that said receiving node is not ready to receive a packet if sufficient space is not available in said primary FIFO to store a received packet.

8. A flow control apparatus in a receiving node of a packetized communication system comprising:

means for applying a received packet from a transmitting node to a primary FIFO in said receiving node and to a secondary FIFO in said receiving node;

means for determining whether said received packet is successfully applied to said secondary FIFO;

means for purging said received packet from said secondary FIFO responsive to a determination that said received Racket was not successfully applied to said secondary FIFO;

means for purging said received Racket from said primary FIFO responsive to a determination that said received packet was successfully applied to said secondary FIFO;

means for determining the readiness of said receiving node to receive another packet in accordance with status of said primary FIFO; and means for applying a flow control signal to said transmitting node indicative of the readiness of said receiving node to receive another packet.

9. The apparatus of claim 8 wherein the means for determining successful application of said received racket to said secondary FIFO includes:

means for detecting an overflow condition of said secondary FIFO by the application of said received packet.

10. The apparatus of claim 8 wherein the means for determining:

means for determining that said receiving node is ready to receive a packet when sufficient space is available in said primary FIFO to store a received packet; and means for determining that said receiving node is not ready to receive a packet when sufficient space is not available in said primary FIFO to store a received packet.

11. A flow and routing control apparatus in a receiving node of a packetized communication system having a plurality of receiving components each associated with one of a plurality of FIFOs including a primary FIFO and a plurality of secondary FIFOs, said apparatus comprising:

means for applying a received packet from a transmitting node simultaneously to said primary FIFO and to at least one of said plurality of secondary FIFOs to which said received packet is routed;

means for determining a status of said primary FIFO;

means for determining the readiness of said receiving node to receive another packet in accordance with said status of said primary FIFO; and means for applying a flow control signal to said transmitting node indicative of the readiness of said receiving node to receive another packet.

12. The apparatus of claim 11 further comprising:

means for purging said received packet from said primary FIFO in response to a determination that said received packet is not routed to said primary FIFO and that none of said at least one of said plurality of secondary FIFOs overflowed.

13. The apparatus of claim 11 wherein the means for application of a received packet includes:

means for applying said received packet to said primary FIFO;

means for applying said received packet to said plurality of secondary FIFOs; and means for purging said received packet from any of said plurality of secondary FIFOs to which said received packet is not routed.

14. The apparatus of claim 11 wherein the means for determining readiness includes:

means for determining that said receiving node is ready to receive a packet if sufficient space is available in said primary FIFO to store a received packet; and means for determining that said receiving node is not ready to receive a packet if sufficient space is not available in said primary FIFO to store a received packet.

15. A flow control method, operable in a receiving node of a packetized communication system, comprising the steps of:

receiving data, from a transmitting node, simultaneously, in a primary FIFO and a secondary FIFO;

determining the readiness of said receiving node to receive another packet based upon space available in either of said primary FIFO and said secondary FIFO; and applying a flow control signal to said transmitting node, responsive to the determination of readiness, indicative of the readiness of said receiving node to receive another packet.

16. A flow control apparatus in a receiving node of a packetized communication system comprising:

a primary FIFO connected to a transmission source to receive transmitted packets;

a secondary FIFO connected to said transmission source to receive transmitted packets simultaneously with said primary FIFO; and flow control logic circuits, associated with said primary FIFO and with said secondary FIFO, for generating a flow control signal indicative of the readiness of said receiving node to receive another packet based upon space available in either of said primary FIFO and said secondary FIFO and applying said flow control signal to said transmission source.

* * * * *